US012688089B2

(12) United States Patent (10) Patent No.: US 12,688,089 B2
Krisman (45) Date of Patent: Jul. 21, 2026

(54) CONDITIONAL HIGH AVAILABILITY PEERING IN AN ALL-ACTIVE NEXT GENERATION FIREWALL (NGFW) CLUSTER

(71) Applicant: Fortinet, Inc., Sunnyvale, CA (US)

(72) Inventor: Rusdy Krisman, Chatswood (AU)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/756,166

(22) Filed: Jun. 27, 2024

(65) Prior Publication Data

US 2026/0003734 A1     Jan. 1, 2026

(51) Int. Cl.
 G06F 11/07          (2006.01)
 G06F 11/14          (2006.01)
(52) U.S. Cl.
 CPC ...... G06F 11/1402 (2013.01); G06F 11/0751 (2013.01)
(58) Field of Classification Search
 CPC ......... G06F 11/1423; H04L 2012/6443; H04L 45/28
 USPC .......................................... 714/4.11, 4.2, 4.1
 See application file for complete search history.

(56) References Cited

U.S. PATENT DOCUMENTS

| 11,329,913 B2 * | 5/2022 | Duan ...................... H04L 43/10 |
| 2021/0152464 A1 * | 5/2021 | Brissette ................. H04L 45/22 |
| 2022/0231936 A1 * | 7/2022 | Mohanty ............. H04L 12/4641 |
| 2024/0039851 A1 * | 2/2024 | Fonseca .............. H04L 63/1425 |
| 2024/0259290 A1 * | 8/2024 | Chen ..................... H04L 45/123 |

FOREIGN PATENT DOCUMENTS

EP          1376988 A1 *   1/2004   ............. H04L 45/00

* cited by examiner

*Primary Examiner* — Chae M Ko
(74) *Attorney, Agent, or Firm* — Law Office of Dorian Cartwright; Dorian Cartwright

(57)          ABSTRACT

A conditional high availability peering among all members of an all-active NGFW cluster is established. Data paths are monitored via a dynamic routing protocol capable of conditional advertisement, such as BGP, to detect network isolation failures. Peering can be temporarily suspended with the remote NGFWs by withdrawing the local IP address used for high availability peering to the remote NGFWs, responsive to the detected data path failure. Responsive to detecting a cure of the failed data path using said dynamic routing protocol, the high availability peering to remote NGFW nodes is automatically restored by resuming advertisement of the local peering IP address of the NGFW, wherein the high availability peering is reactivated for all remote NGFW nodes.

19 Claims, 9 Drawing Sheets

NGFW Cluster Device
110

Link Management
Module
210

Unified Session Table
Module
220

Data Pathn Module
230

CONDITIONAL HIGH AVAILABILITY PEERING IN AN ALL-ACTIVE NEXT GENERATION FIREWALL (NGFW) CLUSTER

FIELD OF THE INVENTION

The invention relates generally to computer networks, and more specifically, conditional high availability peering in an all-active next generation firewall (NGFW) cluster.

BACKGROUND

In an all-active NGFW implementation across multiple sites, all NGFW nodes peer with each other to synchronize various network state information, such as session, network address translation (NAT) and tunnel states forming an active/active (A/A) high availability cluster. By sharing these states among each other, all NGFW nodes across all sites are capable of processing steady state symmetrical and asymmetrical traffic in a stateful manner.

Additionally, NGFW nodes handle various types of failure events, such as, but not limited to, a node reboot, a node shutdown, a local interface shutdown, a remote interface shutdown, a network peering down or a remote route withdrawal event. During such a failure event, the affected NGFW node and/or a peer NGFW node must be able to detect said event and initiate a suitable failover procedure to minimize service interruptions. When said failure is remediated, the affected NGFW node and/or a peer NGFW node must be able to gracefully recover from the failure and initiate a suitable failback procedure to move the traffic back with minimum service interruptions.

An NGFW must be able to process traffic not only at Layer 4, but up to Layer 7 (i.e., the Application Layer), such as in the case of intrusion prevention, web filtering, antivirus/antimalware or other unified threat management (UTM) features. NGFWs configured in an A/A high availability cluster achieve this feat by understanding which node in the cluster is the original owner of a session it is receiving and then bounce the session to the original owner for correct processing at Layer 7. This session bouncing behavior is necessary because nodes in the A/A high availability cluster typically only share session information at Layer 4 that contains session owner information. In other words, only the original session owner is typically capable of processing return traffic at Layer 7.

However, the ability to bounce sessions to the original owners presents a significant challenge during a network isolation event. Network isolation happens when the data path of an NGFW is disrupted, but its high availability synchronization path, the so-called control path, is still available. Network isolation can be caused by a direct interface failure, a remote interface failure, or an upstream routing issue affecting the data path. In this failure scenario, dynamic routing reconverges and directs traffic to an alternate NGFW node. However, the NGFW receiving the failed over traffic will then bounce the incoming traffic back to the NGFW experiencing the network isolation. This happens because even though the alternate NGFW knows the owner of a session it is receiving, it is not aware that the original NGFW is experiencing network isolation, so it still bounces the incoming traffic to that NGFW.

When the original NGFW receives the bounced traffic from alternate NGFW, it will drop the traffic due to failing the reverse path forwarding (RPF) check because it has lost the route to the source network. The only currently known way to recover from this situation is to drop and re-establish all affected sessions again, upon which new sessions will correctly flow to the alternate NGFW without the need to bounce them back to the failing NGFW. There was no known effective method or technique in automatically detecting and recovering from this type of issue.

What is needed is a robust technique for conditional high availability peering in an all-active NGFW cluster.

SUMMARY

To meet the above-described needs, methods, computer program products, and systems for conditional high availability peering in an all-active NGFW cluster.

In one embodiment, a conditional high availability peering to remote NGFW clusters is established. The remote NFGW firewall nodes advertise the availability of the peering IP addresses of NGFW node via a dynamic routing protocol capable of conditionally advertising network routes/prefixes, such as Border Gateway Protocol (BGP).

In another embodiment, a specific session that is new among a plurality of existing sessions is logged in a unified session table with the session ownership information of the specific session. The unified session table comprises the plurality of sessions owned by the remote NGFW nodes is then shared across all NGFW nodes using the conditional high availability peering. All NGFW nodes monitor the data paths at all times using the dynamic routing protocol, such as BGP, to detect any network isolation failures. The high availability peering can then be temporarily suspended by the local NGFW experiencing with the network isolation failure by withdrawing its local IP address used for said high availability peering with remote NGFWs, responsive to the detected data path failure.

In yet another embodiment, responsive to detecting a restoration of the failed data path using a dynamic routing protocol, such as BGP, the high availability peering to the NGFW clusters is automatically restored by resuming advertisement of the IP address of the NGEW, wherein the high availability peering is reactivated for the specific session.

Advantageously, network performance is improved by ensuring control path integrity despite data network isolation failures.

BRIEF DESCRIPTION OF THE DRAWINGS

In the following drawings, like reference numbers are used to refer to like elements. Although the following figures depict various examples of the invention, the invention is not limited to the examples depicted in the figures.

Figure 2:
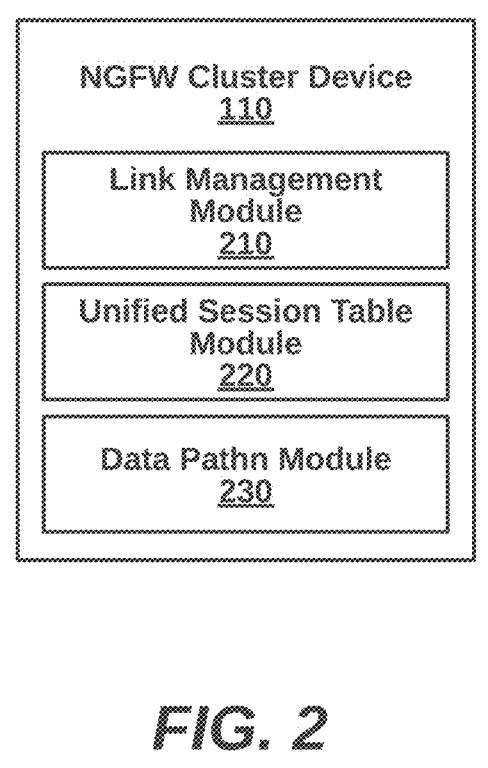

FIG. 2 is a more detailed block diagram illustrating a NGFW device of the system of FIG. 1, according to an embodiment.

DETAILED DESCRIPTION

Methods, computer program products, and systems for conditional high availability peering in an all-active NGFW cluster. The following disclosure is limited only to the purpose of conciseness, as one of ordinary skills in the art will recognize additional embodiments given the ones described herein. For example, NGFWs are described throughout as operating on Layer 7 of the IP protocol, however the same techniques can be applied to higher layers of different protocols.

I. Systems for Conditional High Availability Peering (FIGS. 1-3)

Figure 1:
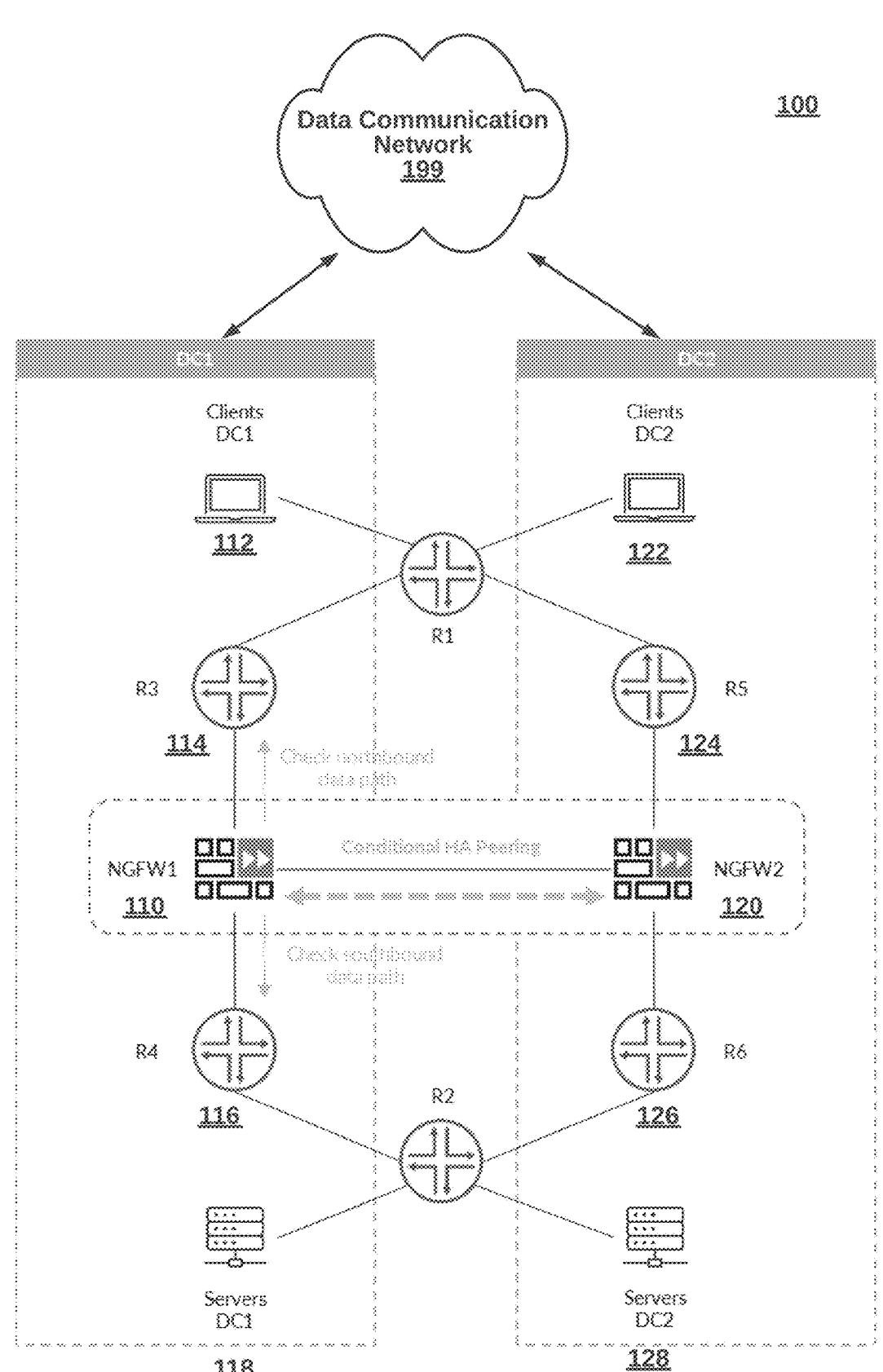
FIG. 1 is a high-level block diagram illustrating aspects of a system for conditional high availability peering in an all-active NGFW cluster, according to some embodiments.
Figure 6:
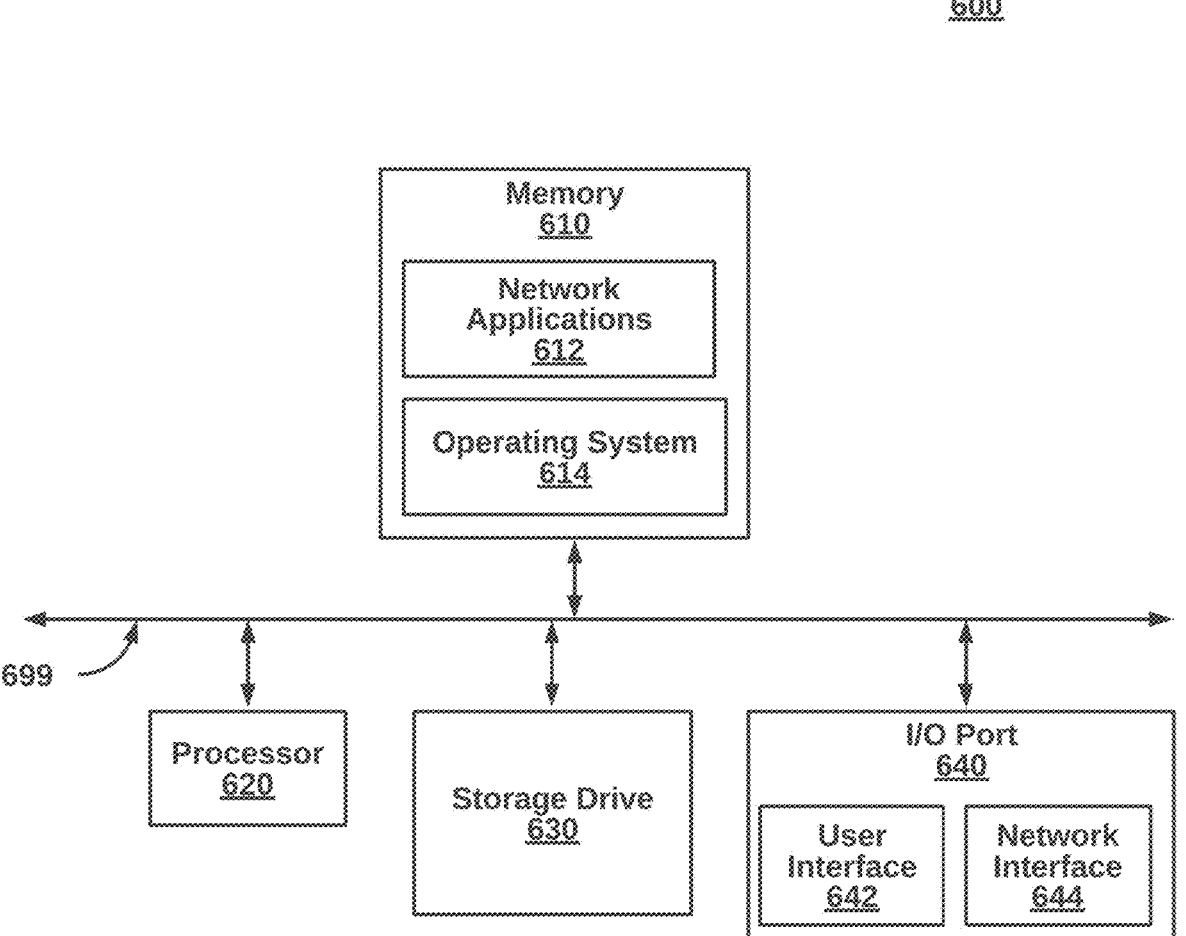
FIG. 6 is a block diagram illustrating an example computing device for the system of FIG. 1, according to an embodiment.

FIG. 1 is a high-level block diagram illustrating a system 100 for conditional high availability peering in an all-active NGFW cluster, according to an embodiment. System 100 includes a local NGFW cluster device 110, a remote NGFW cluster device 120, clients 112, 122, routers 114, 116, 124, 126, and servers 118, 128, on a data communication network 199. Other embodiments of system 100 can include additional components that are not shown in FIG. 1, such as switches, network gateways, and access points. Further, there can be more NGFW cluster devices, clients, routers and servers. The components of system 100 can be implemented in hardware, software, or a combination of both. An example implementation is shown in FIG. 6.

In one embodiment, the components of system 100 are coupled in communication over a private network connected to a public network, such as the Internet. In another embodiment, system 100 is an isolated, private network, or alternatively, a set of geographically dispersed LANs. The components can be connected to the data communication system via hard wire (e.g., NFGW cluster devices 110, 120, routers 114, 116, 124, 126 and servers 118, 128). The components can also be connected via wireless networking (e.g., clients 112, 122). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or Ipv6 address spaces.

In one embodiment, the local NGFW device 110 can be linked to remote NGFW device 120 to establish an all-active high availability cluster, on a conditional basis rather than statically. In other words, the high availability peering can be active when there are no internal faults on either side and can be temporarily suspended automatically while internal faults exist within a cluster. The NGFW devices are further described below with respect to FIG. 2.

The clients 112, 122 can send requests to servers 118, 128 for data files, web pages, and other resources. The clients 112, 122 can be a personal computer, a laptop, a smartphone, a tablet, a terminal, or any other appropriate processor-driven network device. The routers 114, 116, 124, 126 use routing tables to direct network traffic requests between source and destination over different path options. The routers R1 and R2 are external aggregator routers that connect clusters. Server 118 and 128 can respond to resource requests from client 112 and 122.

FIG. 2 is a more detailed block diagram illustrating the NGFW cluster device 110 of the system of FIG. 1, according to one embodiment. The NGFW device 110 includes a link management module 210, a unified session table module 220, and a data path module 230. The components can be implemented in hardware, software, or a combination of both.

The link management module 210 establishes a conditional high availability peering link to remote NGFW nodes. The local NFGW firewall node advertises the availability of its peering IP address to remote NGFW nodes via dynamic routing protocol capable of conditional routing advertisement, such as BGP. NGFWs process Layer 7 packet data for unified malware detection, for example, by unpacking packet and using rules to examine application characteristics for malware. The high availability cluster only shares Layer 4 characteristics (e.g., source IP address, destination IP address, destination port, and protocol (TCP/UDP)) among cluster members. Therefore, Layer 7 is only available locally, i.e. not shared with remote NGFW nodes.

The link management module 210 temporarily suspends high availability peering with the one of the remote NGFWs associated with the failure by withdrawing (e.g., stop advertising) the IP address used for high availability peering to the remote NGFWs, responsive to the detected data path failure. Responsive to detecting a restoration of the failed data path using said dynamic routing protocol, such as BGP, the high availability management module 210 restores the high availability peering to remote NGFW nodes by resuming advertisement of its peering IP address. The high availability peering is reactivated for all remote NGFW nodes.

The unified session table module 220 logs a specific session that is new among a plurality of existing sessions in a unified session table. The unified session table comprises the plurality of sessions owned by all NGFW nodes.

The data path module 230 monitors data paths via said dynamic routing protocol, such as BGP, for network isolation failures. For example, using BGP, a single or multiple data paths can be monitored. When a failure is detected in a data path associated with the local NGFW node, the link management module 210 can be notified.

Figure 3A:
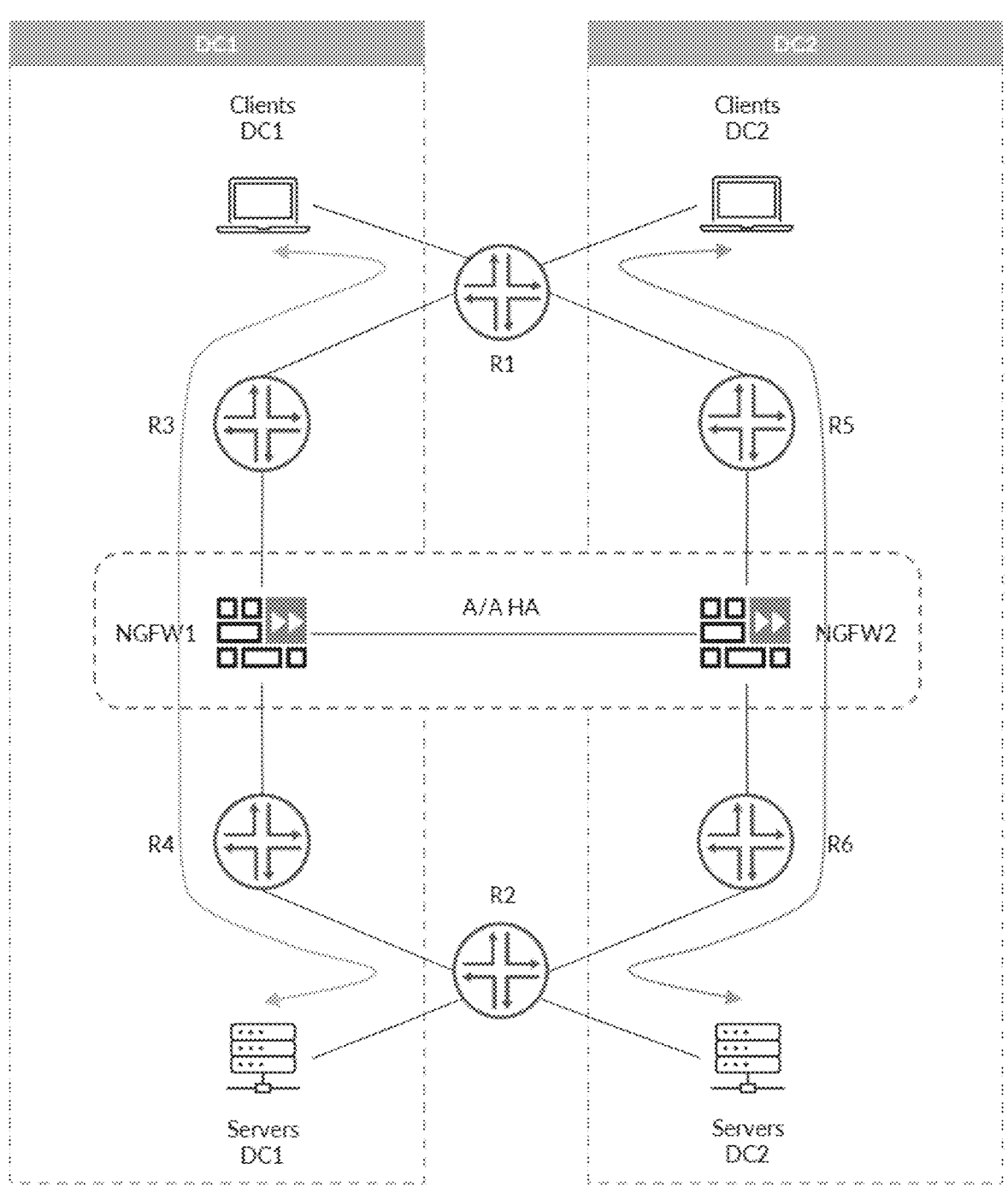
FIGS. 3A-3D is a block diagram illustrating data paths during different flow states of the system of FIG. 1, according to an embodiment.
Figure 3B:
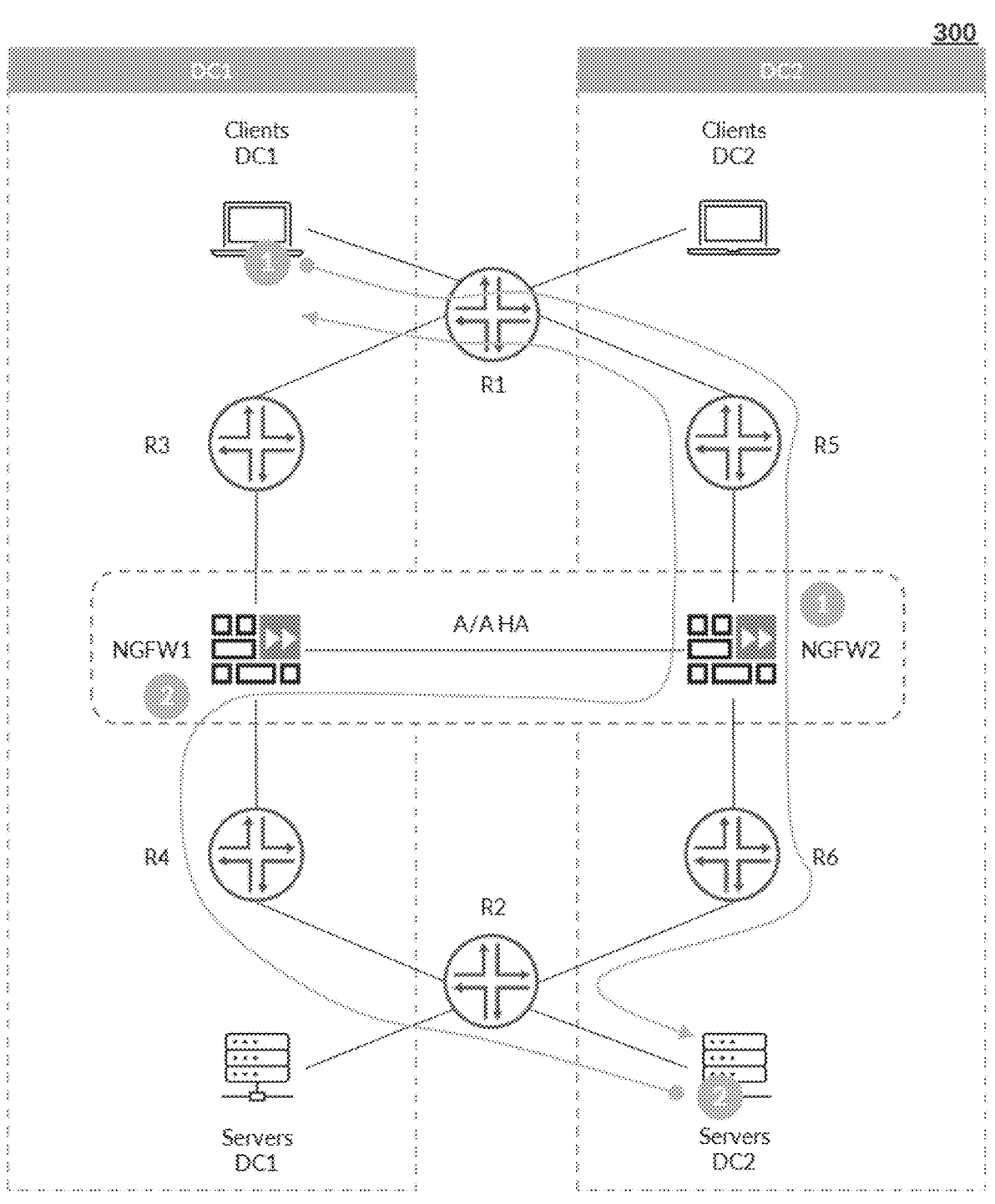
Figure 3C:
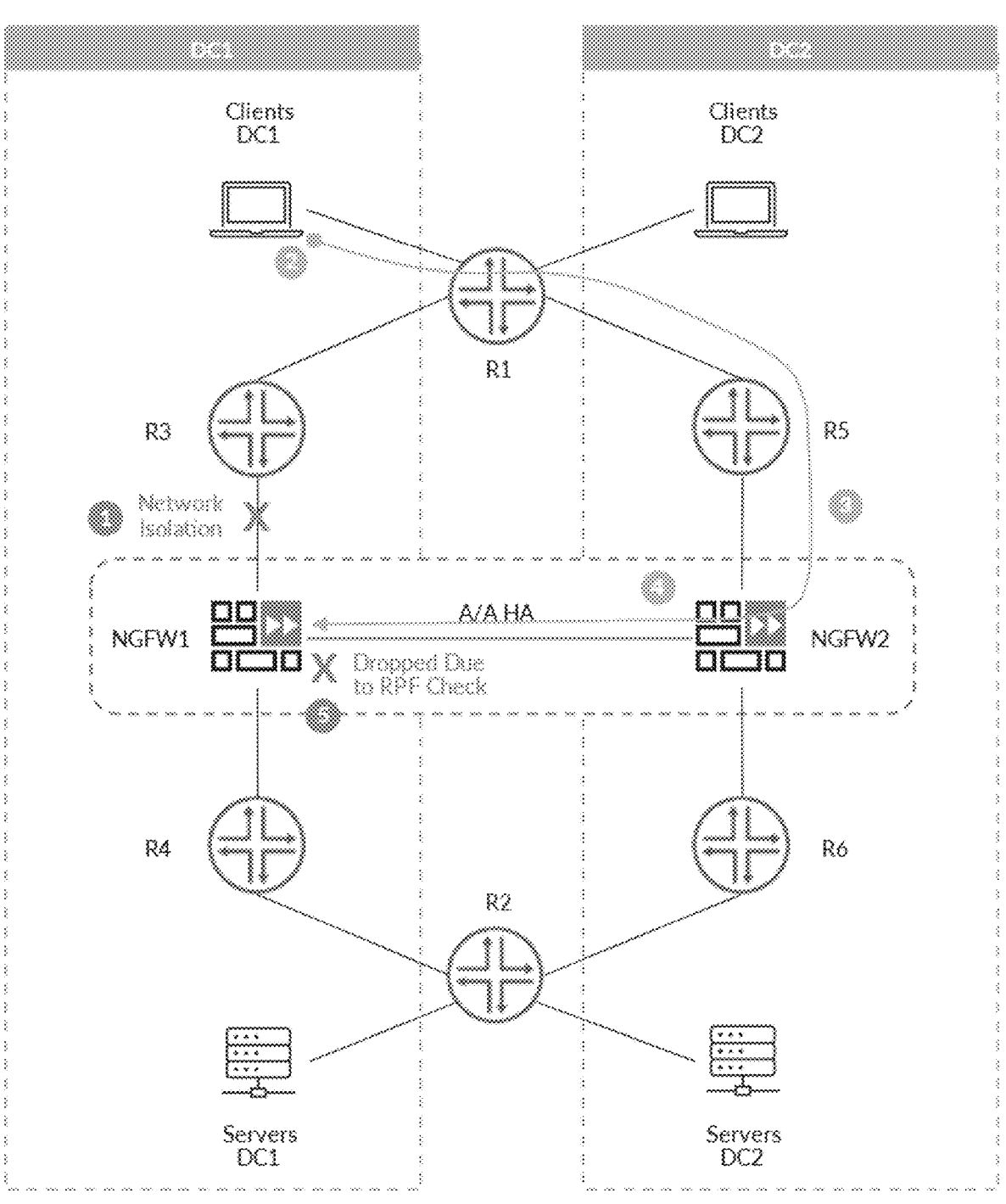
Figure 3D:
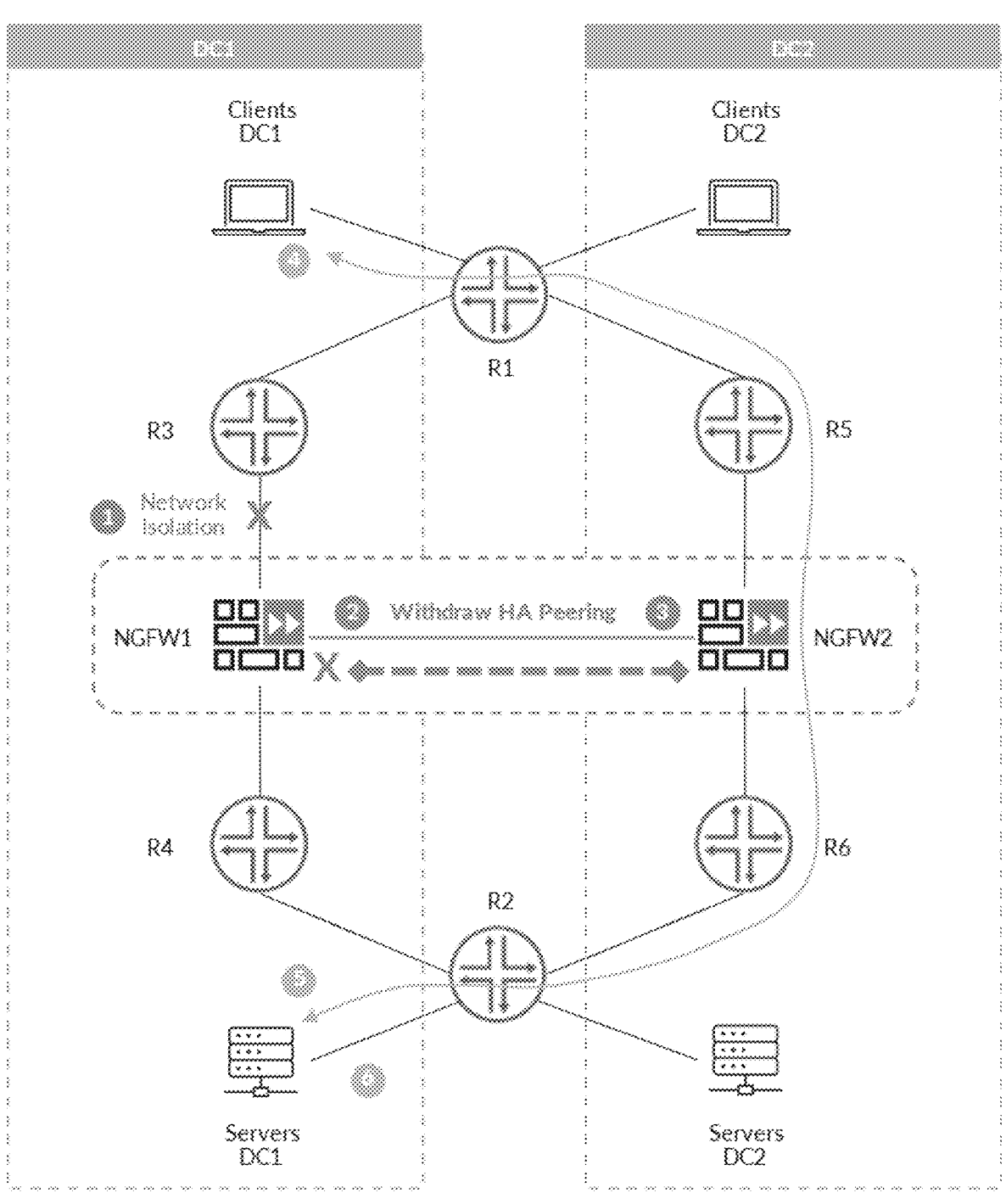

FIGS. 3A-3D is a more detailed block diagram illustrating data paths of the system of FIG. 1, according to one embodiment. A symmetric flow state is illustrated in FIG. 3A in which data paths remain local. Responsive to certain conditions and policies, data paths switch to asymmetric flow state as illustrated in FIG. 3B, as managed by conditional high availability links. Network isolations can occur at various times as shown in FIG. 3C, introducing an asymmetrical flow state. Without the conditional peering, packet blackholing occurs on the NGFW node experiencing the network isolation due to the bounced session from remote NGFW node failing RPF check on the local NGFW node due to said network isolation. By implementing conditional peering, consequently, FIG. 3D illustrates the continuation of asymmetric flows while high availability has been temporarily suspended and therefore avoiding said packet blackholing situation. Eventually, once network isolation is cured, the high availability peering is restored, and the flow state returns to the data paths shown in FIG. 3A.

A more detailed description of data paths:

DC1-DC1 Steady State Symmetrical Flows:

1. Inbound traffic to server: DC1 Client→R1→R3→NGFW1→R4→R2→DC1 Server
2. NGFW1 synchronizes the client-server sessions and NAT entries to NGFW2 in near real-time.

3. Return traffic: DC1
Server→R2→R4→NGFW1→R3→R1→DC1 Client

DC2-DC2 Steady State Symmetrical Flows:
1. Inbound traffic to server: DC2
Client→R1→R5→NGFW2→R6→R2→DC2 Server
2. NGFW2 synchronizes the client-server sessions and NAT entries to NGFW1 in near real-time
3. Return traffic: DC2
Server→R2→R6→NGFW2→R5→R1→DC2 Client DC1-DC2 Steady State Asymmetrical Flows:
1. Inbound traffic to server: DC1
Client→R1→R5→NGFW2→R6→R2→DC2 Server
2. NGFW2 synchronizes the client-server sessions and NAT entries to NGFW1 in near real-time
3. Return traffic: DC2
Server→R2→R4→NGFW1→NGFW2→R5→R1→DC1 Client DC1-DC1 Network Isolation Flows:
1. Failure: Link between R3 and NGFW1 fails, either locally or remotely. Alternatively, the link between R3 and NGFW1 can still be operational, but the dynamic routing peering between R3 and NGFW1 is down.
2. Convergence: Routing reconverges to DC2
3. Inbound traffic: DC1 Client→R1→R5→NGFW2
4. Session bouncing: NGFW2→NGFW1 (NGFW2 knows that NGFW1 is the session owner, but is not aware NGFW1 is experiencing a network isolation, so it still bounces the inbound traffic to NGFW1)
5. Blackholing: NGFW1 receives the bounced traffic from NGFW2 and drop the traffic (NGFW1 loses the route to the clients IP subnet in DC1, because it fails the RPF check due to the missing source network in its routing table
Recovery: The only clean way to recover from this situation is to drop and re-establish all existing sessions again, upon which new sessions will correctly flow from Client→R1→R5→NGFW2→R6→R2→Server and vice versa DC1-DC1 Flows by Overcoming the Network Isolation Using Conditional High Availability Peering:
1. Failure: Link between R3 and NGFW1 fails, either locally or remotely. Alternatively, the link between R3 and NGFW1 can still be operational, but the dynamic routing peering between R3 and NGFW1 is down.
2. Withdraw peering: NGFW1 detects the northbound network isolation event and withdraws its high availability peering IP address(es) from NGFW2
3. Stop peering: NGFW2 loses the NGFW1's high availability peering IP address(es) and stop the peering immediately
4. Convergence: Routing reconverges to DC2
5. Inbound traffic: DC1
Client→R1→R5→NGFW2→R6→R2→DC1 Server
6. Return traffic: DC1
Server→R2→R6→NGFW2→R5→R1→DC1 Client II. Methods for Conditional High Availability Peering (FIGS. 4-5)

Figure 4:
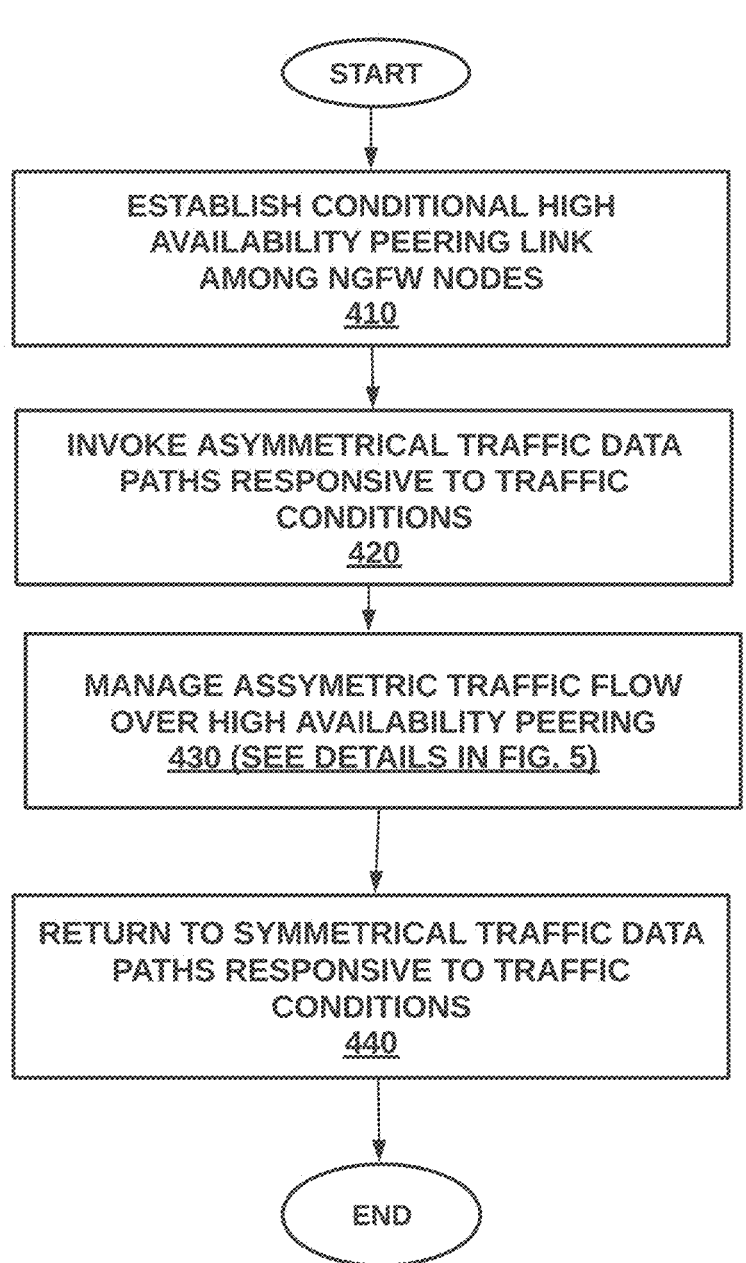
FIG. 4 is a high-level flow diagram illustrating a method for asymmetrical flows in NGFW clusters, according to an embodiment.
Figure 5:
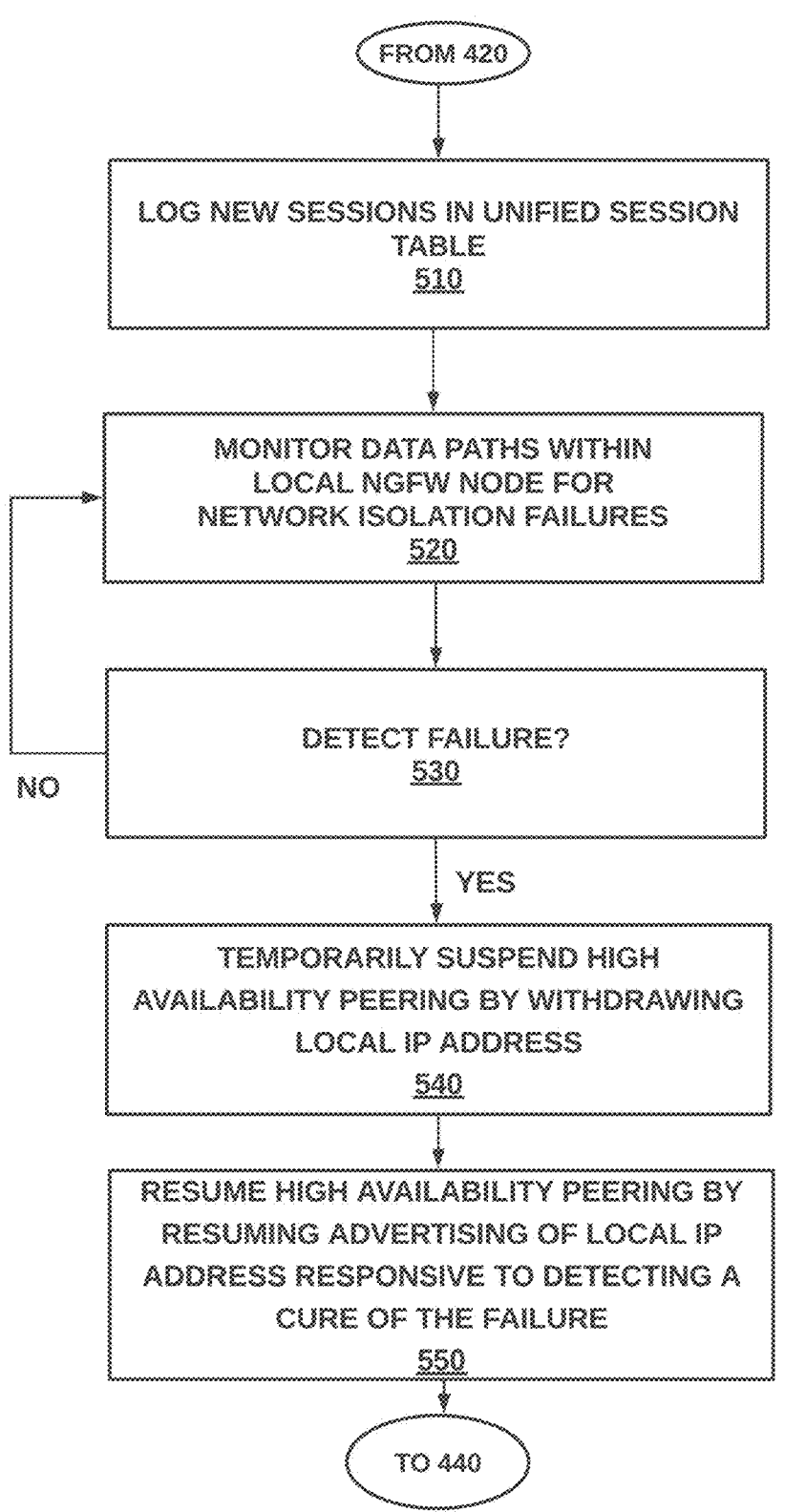
FIG. 5 is a flow diagram illustrating a step of conditional high availability peering in an all-active NGFW cluster, from the method of FIG. 5, according to an embodiment.

FIG. 4 is a high-level flow diagram of a method 400 for conditional high availability peering in an all-active NGFW cluster, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, a conditional high availability peering is established to link remote NGFW nodes. The remote NGFW firewall nodes advertise availability of their peering IP addresses via a dynamic routing protocol, such as BGP.

At step 420, responsive to traffic conditions, dynamic routing convergences invoking asymmetric traffic data paths.

At step 430, conditional high availability peering manages the flow of asymmetrical traffic, as described further below in association with FIG. 5.

At step 440, responsive to updated traffic conditions, data paths return to symmetrical traffic.

FIG. 5 provides further details for an embodiment of step 430 of conditional high availability peering in an all-active NGFW cluster, from the method 400 of FIG. 4. Many other variations are possible.

At step 510, a specific session that is new among a plurality of existing sessions is logged in a unified session table shared among all NGFW nodes. The unified session table comprises the plurality of sessions owned by the remote NGFW clusters.

At step 520, a dynamic routing protocol, such as BGP, monitors data paths for network isolation failures.

At step 530, the local NGFW node detects a failure in one of the monitored data paths.

At step 540, high availability peering to all remote NGFWs is temporarily suspended by withdrawing (stop advertising) the IP address used for high availability peering to the remote NGFWs, responsive to the detected data path failure.

At step 550, responsive to detecting a cure of the failed data path using said dynamic routing protocol, the high availability peering to all remote NGFW nodes is restored by resuming advertisement of the peering IP address of the local NGFW. The high availability peering is reactivated for all remote NGFW nodes.

III. Computing Device for Conditional High Availability Peering (FIG. 6)

FIG. 6 is a block diagram illustrating a computing device 600 for use in system 100 of FIG. 1, according to one embodiment. The computing device 600 is a non-limiting example device for implementing each of the components of the system 100, including NGFW devices 110 and 120.

The computing device 600 of the present embodiment, includes a memory 610, a processor 620, a hard drive 630, and an I/O port 640. Each of the components is coupled for electronic communication via a bus 650. Communication can be digital and/or analog and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 is typically a hardened operating system suitable for a secure NGFW.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed of silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTI-GATE family of network security appliances and FORTI-CARRIER family of consolidated security appliances), messaging security appliances (e.g., FORTIMAIL and FORTIPHISH families of messaging security appliances), web application firewall appliances (e.g., FORTIWEB family of web application firewall appliances), application acceleration appliances, server load balancing appliances (e.g., FORTIADC family of application delivery controllers), vulnerability management appliances (e.g., FORTIDEVSEC family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDENS family of DNS appliances), wireless security appliances (e.g., FORTI Wi-Fi family of wireless security gateways), FORTIDDOS, wireless access point appliances (e.g., FOR-TIAP wireless access points), switches (e.g., FOR-TISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a next generation firewall cluster (NGFW) device, on a data communication network, for conditional high availability peering in an all-active NGFW cluster, the method comprising:

establishing conditional high availability peering among nodes in an all-active NGFW cluster, wherein each NFGW node advertises the availability of its peering Internet Protocol (IP) address via a dynamic routing protocol capable of conditional advertisement wherein all NGFW nodes capable of processing packet data at Layer 7 for unified threat management;

monitoring data paths via said dynamic routing protocol for network isolation failures;

detecting local failure in one of the monitored data paths;

temporarily suspending the high availability peering with all remote NGFWs by withdrawing a local peering IP address, responsive to the detected data path failure; and responsive to detecting a cure of the failed data path via said dynamic routing protocol restoring the high availability peering to all remote NGFWs by resuming advertisement of the local peering IP address, wherein the high availability peering is reactivated all remote NGFWs.

2. The method of claim 1, wherein the dynamic routing protocol comprises Gateway Protocol (BGP).

3. The method of claim 1, further comprising logging a specific session that is new among a plurality of existing sessions in a unified session table with session ownership information of the specific session.

4. The method of claim 3, further comprising sharing the unified session table comprising the plurality of sessions across all NGFW nodes using the conditional high availability peering.

5. The method of claim 1, wherein the network isolation failure is caused by a direct interface failure, a remote interface failure, or an upstream routing issue affecting the data path.

6. The method of claim 1, wherein processing packet data at Layer 7 for unified threat management comprises processing the packet data for intrusion prevention, web filtering, or antivirus and antimalware.

7. The method of claim 1, further comprising bouncing a session to an original session owner node in the all-active NGFW cluster for correct processing at Layer 7.

8. The method of claim 1, wherein temporarily suspending the high availability peering prevents dropping traffic due to failing a reverse path forwarding (RPF) check.

9. The method of claim 1, wherein withdrawing the local peering IP address comprises stopping the advertisement of the local peering IP address to the remote NGFWs.

10. The method of claim 1, wherein the conditional high availability peering prevents packet blackholing on the NGFW node experiencing the network isolation failure.

11. The method of claim 1, further comprising invoking asymmetrical traffic data paths responsive to the network isolation failure.

12. The method of claim 11, further comprising returning to symmetrical traffic data paths responsive to detecting the cure of the failed data path.

13. The method of claim 1, wherein the data communication network comprises a software-defined wide area network (SD-WAN).

14. The method of claim 1, wherein the nodes in the all-active NGFW cluster share network state information comprising session, network address translation (NAT), and tunnel states.

15. The method of claim 1, wherein temporarily suspending the high availability peering and restoring the high availability peering are executed by a link management module of the NGFW device.

16. A non-transitory computer-readable medium storing source code in a next generation firewall cluster (NGFW) device, on a data communication network, that when executed by a processor, performs a method for conditional high availability peering in an all-active NGFW cluster, the method comprising:

establishing a conditional high availability peering among nodes in an all-active NGFW cluster, wherein each NFGW node advertises the availability of its peering Internet Protocol (IP) address via a dynamic routing protocol capable of conditional advertisement wherein all NGFW nodes capable of processing packet data at Layer 7 for unified threat management;

monitoring data paths via said dynamic routing protocol for network isolation failures;

detecting local failure in one of the monitored data paths;

temporarily suspending the high availability peering with all remote NGFWs by withdrawing a local peering IP address, responsive to the detected data path failure; and responsive to detecting a cure of the failed data path via said dynamic routing protocol restoring the high availability peering to all remote NGFWs by resuming advertisement of the local peering IP address, wherein the high availability peering is reactivated all remote NGFWs.

17. The method of claim 16, wherein said dynamic routing protocol comprises Border Gateway Protocol (BGP).

18. A next generation firewall cluster (NGFW) device, on a data communication network, for conditional high availability peering in an all-active NGFW cluster, the NGFW device comprising:

a processor;

a network interface communicatively coupled to the processor and to a data communication network; and a memory, communicatively coupled to the processor and storing:

establishing a conditional high availability peering among nodes in an all-active NGFW cluster, wherein each NFGW node advertises the availability of its peering Internet Protocol (IP) address via a dynamic routing protocol capable of conditional advertisement wherein all NGFW nodes capable of processing packet data at Layer 7 for unified threat management;

monitoring data paths via said dynamic routing protocol for network isolation failures;

detecting local failure in one of the monitored data paths;

temporarily suspending the high availability peering with all remote NGFWs by withdrawing a local peering IP address, responsive to the detected data path failure; and responsive to detecting a cure of the failed data path via said dynamic routing protocol (restoring the high availability peering to all remote NGFWs by resuming advertisement of the local peering IP address, wherein the high availability peering is reactivated all remote NGFWs.

19. The NGFW device of claim 18, wherein said dynamic routing protocol comprises Border Gateway Protocol (BGP).

* * * * *